US012764072B2

(12) United States Patent
Bouazizi et al.

(10) Patent No.: US 12,764,072 B2
(45) Date of Patent: Oct. 13, 2026

(54) BACKGROUND DATA TRAFFIC DISTRIBUTION OF MEDIA DATA

(71) Applicant: QUALCOMM Incorporated, San Diego, CA (US)

(72) Inventors: Imed Bouazizi, Frisco, TX (US); Thomas Stockhammer, Bergen (DE); Charles Nung Lo, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 160 days.

(21) Appl. No.: 17/648,886

(22) Filed: Jan. 25, 2022

(65) Prior Publication Data

US 2022/0239601 A1 Jul. 28, 2022

Related U.S. Application Data

(60) Provisional application No. 63/141,580, filed on Jan. 26, 2021.

(51) Int. Cl.
*H04L 47/525* (2022.01)
*H04L 47/74* (2022.01)
(Continued)

(52) U.S. Cl.
CPC .......... *H04L 47/525* (2013.01); *H04L 47/741* (2013.01); *H04L 47/78* (2013.01); *H04L 65/61* (2022.05)

(58) Field of Classification Search
CPC ..... H04L 47/525; H04L 47/741; H04L 47/78; H04L 65/61; H04L 65/80; H04L 65/612;
(Continued)

(56) References Cited

U.S. PATENT DOCUMENTS

| | | | | |
|---|---|---|---|---|
| 10,764,143 | B2 * | 9/2020 | Huang | H04L 47/20 |
| 2008/0229335 | A1 | 9/2008 | Robbin et al. | |

(Continued)

FOREIGN PATENT DOCUMENTS

| | | | |
|---|---|---|---|
| CN | 105052107 | A | 11/2015 |
| CN | 105897769 | A | 8/2016 |

(Continued)

OTHER PUBLICATIONS

"3rd Generation Partnership Project, Technical Specification Group Services and System Aspects, Procedures for the 5G System (5GS), Stage 2 (Release 15)", 3GPP Standard, 3GPP TS 23.502, 3rd Generation Partnership Project (3GPP), Mobile Competence Centre, 650, Route Des Lucioles, F-06921 Sophia-Antipolis Cedex, France, vol. SA WG2, No. V15.12.0, Dec. 17, 2020 (Dec. 17, 2020), pp. 1-365, XP051999817, Retrieved from the Internet: URL: https://ftp.3gpp.org/Specs/latest/Rel-15/23_series/23502-fc0.zip 23502-fc0.docx [Retrieved on Dec. 17, 2020].

(Continued)

*Primary Examiner* — Tonia L Dollinger
*Assistant Examiner* — Mehulkumar J Shah
(74) *Attorney, Agent, or Firm* — Shumaker & Sieffert, P.A.

(57) ABSTRACT

An example device for retrieving media data includes a memory configured to store media data; and one or more processors implemented in circuitry and configured to: send a request to retrieve media data according to a background data transfer to a media streaming application function (AF); in response to the request, receive an indication of a background data transfer opportunity from the media streaming AF; in response to the indication of the background data transfer opportunity, retrieve the media data according to the background data transfer; and store the retrieved media data to the memory.

18 Claims, 8 Drawing Sheets

(51) Int. Cl.
*H04L 47/78* (2022.01)
*H04L 65/61* (2022.01)

(58) Field of Classification Search
CPC ....... H04L 65/65; H04L 65/70; H04L 65/765; H04L 47/74; H04L 65/75; H04L 65/4069; H04L 65/762; H04L 65/1063; H04W 4/50; H04N 21/458
See application file for complete search history.

(56) References Cited

U.S. PATENT DOCUMENTS

| | | | | |
|---|---|---|---|---|
| 2012/0281536 | A1 | 11/2012 | Gell et al. | |
| 2016/0012843 | A1 | 1/2016 | Major et al. | |
| 2016/0337883 | A1 | 11/2016 | Raleigh et al. | |
| 2019/0342874 | A1 | 11/2019 | Davydov et al. | |
| 2020/0022027 | A1 | 1/2020 | Iwai et al. | |
| 2020/0100080 | A1* | 3/2020 | Mladin | H04W 4/50 |
| 2020/0112761 | A1 | 4/2020 | Stockhammer et al. | |
| 2020/0252813 | A1* | 8/2020 | Li | G06Q 20/382 |
| 2020/0344774 | A1* | 10/2020 | Starsinic | H04W 4/70 |
| 2021/0320955 | A1* | 10/2021 | Kolan | H04L 65/765 |
| 2021/0344998 | A1* | 11/2021 | Sodagar | H04L 65/765 |
| 2022/0279431 | A1* | 9/2022 | Azorero | H04M 15/41 |
| 2022/0408423 | A1* | 12/2022 | Ljung | H04W 72/20 |
| 2023/0113108 | A1* | 4/2023 | Tao | H04W 12/06 455/418 |

FOREIGN PATENT DOCUMENTS

| | | | |
|---|---|---|---|
| CN | 112020104 | A | 12/2020 |
| KR | 20030046817 | A | 6/2003 |
| WO | 2020199129 | A1 | 10/2020 |

OTHER PUBLICATIONS

International Search Report and Written Opinion—PCT/US2022/013849—ISA/EPO—Apr. 4, 2022, 12 pp.

TTA, et al., "Interworking of oneM2M Service Layer to Underlying 3GPP 4G and 5G Networks", Indutry_Day-2018-0005-Interworking_of_ONEM2M_Service_Layer_to_Underlying_3GPP_4G_AND_5G_NETW. PPTX, ONEM2M vol. Industry Day, Industry D Sep. 21, 2018 (Sep. 21, 2018), pp. 1-11, XP084029143, Retrieved from the Internet: URL: http://member.onem2m.org/Application/documentapp/downloadimmediate/default.aspx?dociD=28039 [Retrieved on Sep. 21, 2018] The Whole Document.

3GPP TR 26.804: "3rd Generation Partnership Project; Technical Specification Group Services and System Aspects; Study on 5G Media Streaming Extensions (Release 17)", 3GPP TR 26.804 V1.0.0 (Dec. 2021), pp. 1-106.

3GPP TS 23.502: "3rd Generation Partnership Project; Technical Specification Group Services and System Aspects; Procedures for the 5G System (5GS); Stage 2 (Release 17)" 3GPP TS 23.502 V17.3.0 (Dec. 2021), pp. 1-719.

3GPP TS 26.512: "3rd Generation Partnership Project; Technical Specification Group Services and System Aspects; 5G Media Streaming (5GMS); Protocols (Release 16)", 3GPP TS 26.512 V16.4.0 (Sep. 2021), pp. 1-135.

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1st Meeting: Geneva, CH, Oct. 19-21, 2015, No. H.266, JVET-A1001, Feb. 24, 2016 (Feb. 24, 2016), XP030150000, 27 Pages, URL: http://phenix.int-evry.fr/jvet/.

ETSI TS 126 501: "5G; 5G Media Streaming (5GMS); General Description And Architecture (3GPP TS 26.501 version 16.5.0 Release 16)", ETSI TS 126 501 V16.5.0 (Oct. 2020), 74 Pages.

Fielding R., et al., "Hypertext Transfer Protocol—HTTP/1.1", Network Working Group, Request for Comments, RFC 2616, Standards Track, Jun. 1999, pp. 1-114.

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

Paila T., et al., "FLUTE—File Delivery Over Unidirectional Transport", FLUTE—File Delivery over Unidirectional Transport, rfc6726.txt, Internet Engineering Task Force (IETF), Standard Track, Internet Society (ISOC) 4, Rue Des Falaises CH-1205 Geneva, Switzerland, Nov. 6, 2012 (Nov. 6, 2012), XP015086468, pp. 1-46, http://tools.ietf.org/ html/rfc6726, [retrieved on Nov. 6, 2012], p. 3, line 30—p. 27, line 12.

3GPP: "3rd Generation Partnership Project, Technical Specification Group Services and System Aspects, 5G Media Streaming (5GMS), General Description and Architecture (Release 16)", TS 26.501 V16.6.1, Jan. 18, 2021, 79 Pages, Figure 4.1-1, Sections 3.3 and 4.2.1.

Taiwan Search Report TW111103426 TIPO Aug. 22, 2025.

(Ericsson LM): "3rd Generation Partnership Project; Technical Specification Group Services and System Aspects; 5G Media Streaming (5GMS); General description and architecture (Release 16)", 3GPP TS 26.501, V16.1.0, Sep. 2019, 11 Pages.

* cited by examiner

BACKGROUND DATA TRAFFIC DISTRIBUTION OF MEDIA DATA

This application claims the benefit of U.S. Provisional Application No. 63/141,580, filed Jan. 26, 2021, the entire contents of which are hereby incorporated by reference.

TECHNICAL FIELD

This disclosure relates to transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

After media data, such as video data, has been encoded, the media data may be packetized for transmission or storage. The media data may be assembled into a media file conforming to any of a variety of standards, such as the International Organization for Standardization (ISO) base media file format and extensions thereof, such as AVC.

SUMMARY

In general, this disclosure describes techniques for streaming media data using background data transfer. In some instances, background data transfer may be used to distribute content in an efficient manner to customers. That is, media data may be sent to client devices during off-peak hours (e.g., when many users are asleep or otherwise not using their devices). Users of the client devices may then play back media data transferred via background data transfer at a later time. Mobile network operators (MNOs) may offer reduced charging for traffic during off-peak hours. An application provider may make predictions about what content will be consumed by various customers, then push the appropriate content to corresponding client devices (also referred to as "user equipment" or "UE") during a designated time window, e.g., during off-peak hours.

This disclosure describes various techniques related to transferring media data using background data transfer. For example, this disclosure describes techniques related to managing the download process on client devices and the network, how downloads may be triggered, and how cache space on the client devices may be managed.

In one example, a method of retrieving media data includes sending, by one or more processors of a client device, a request to retrieve media data according to a background data transfer to a media streaming application function (AF); in response to the request, receiving, by the one or more processors of the client device, an indication of a background data transfer opportunity from the media streaming AF; in response to the indication of the background data transfer opportunity, retrieving, by the one or more processors, the media data according to the background data transfer; and storing, by the one or more processors, the retrieved media data.

In another example, a device for retrieving media data, the device comprising: a memory configured to store media data; and one or more processors implemented in circuitry and configured to: send a request to retrieve media data according to a background data transfer to a media streaming application function (AF); in response to the request, receive an indication of a background data transfer opportunity from the media streaming AF; in response to the indication of the background data transfer opportunity, retrieve the media data according to the background data transfer; and store the retrieved media data to the memory.

In another example, a computer-readable storage medium has stored thereon instructions that, when executed, cause one or more processors of a client device to: send a request to retrieve media data according to a background data transfer to a media streaming application function (AF); in response to the request, receive an indication of a background data transfer opportunity from the media streaming AF; in response to the indication of the background data transfer opportunity, retrieve the media data according to the background data transfer; and store the retrieved media data to the memory.

In another example, a device for retrieving media data includes: means for sending a request to retrieve media data according to background data transfer; means for receiving, in response to the request, an indication of a background data transfer opportunity; means for retrieving, in response to the indication of the background data transfer opportunity, the media data according to the background data transfer; and means for storing the retrieved media data.

The details of one or more examples are set forth in the accompanying drawings and the description below. Other features, objects, and advantages will be apparent from the description and drawings, and from the claims.

DETAILED DESCRIPTION

Figure 1:
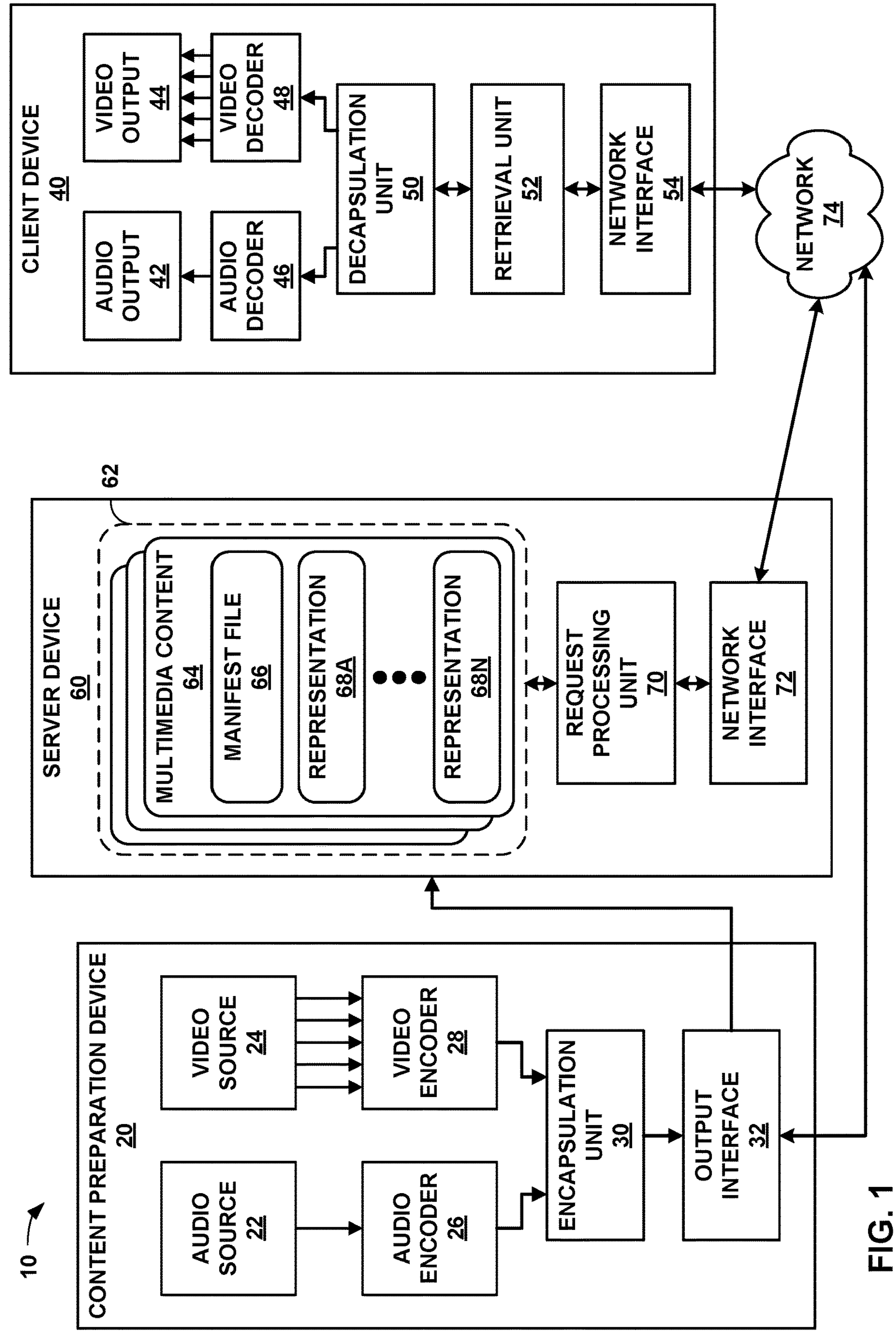
FIG. 1 is a block diagram illustrating an example system that implements techniques for streaming media data over a network.

In general, this disclosure describes techniques for streaming media data using background data transfer. In some instances, background data transfer may be used to distribute content in an efficient manner to customers. That is, media data may be sent to client devices during off-peak hours (e.g., when many users are asleep or otherwise not using their devices). Users of the client devices may then play back media data transferred via background data transfer at a later time. Mobile network operators (MNOs) may offer reduced charging for traffic during off-peak hours. An application provider may make predictions about what content will be consumed by various customers, and then push the appropriate content to corresponding client devices (also referred to as "user equipment" or "UE"), based on the predictions, during a designated time window, e.g., during off-peak hours.

This disclosure describes various techniques related to transferring media data using background data transfer. For example, this disclosure describes techniques related to managing the download process on client devices and the network, how downloads may be triggered, and how cache space on the client devices may be managed.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that were captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC, the ITU-T H.265 High Efficiency Video Coding (HEVC) standard, and the ITU-T H.266 Versatile Video Coding (VVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Content preparation device 20 and/or server device 60 may represent application provider devices, while client device 40 may represent user equipment (UE). Network 74 may represent a Fifth Generation (5G) mobile network. In general, content preparation device 20 and/or server device 60 may create background data transfer (BDT) configuration, and client device 40 may determine to download media data using a background data transfer. Client device 40 (e.g., retrieval unit 52) may execute a media session handler (MSH) and a media player application or streaming application (e.g., a DASH application or plug-in to a web browser). In accordance with the techniques of this disclosure, retrieval unit 52 may request to perform a background data transfer to retrieve media data from, e.g., server device 60, receive data representing a BDT opportunity for a particular time, and then perform the background data transfer at the time indicated for the BDT opportunity.

Figure 2:
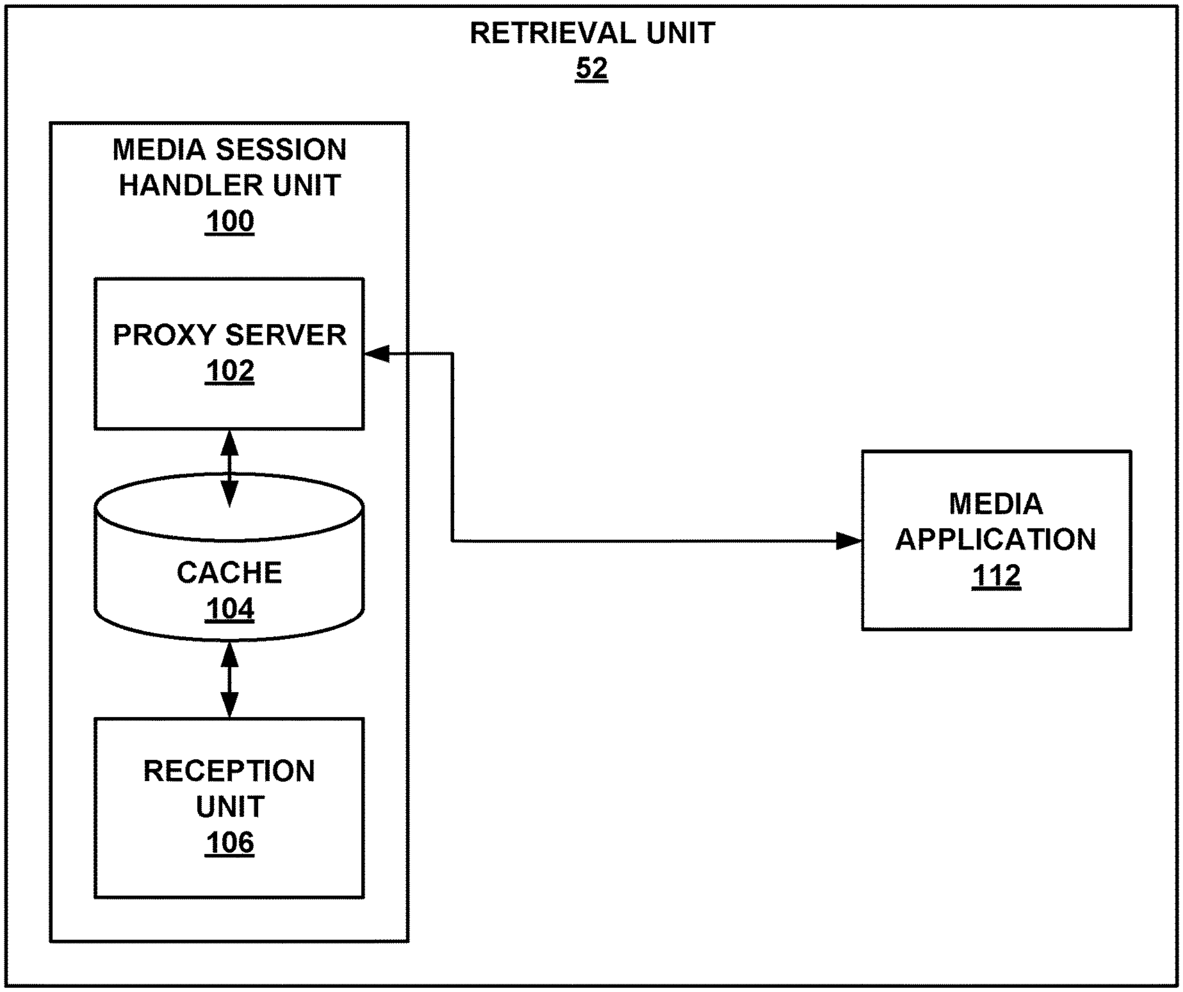
FIG. 2 is a block diagram illustrating an example set of components of a retrieval unit.

FIG. 2 is a block diagram illustrating an example set of components of retrieval unit 52 of FIG. 1 in greater detail. In this example, retrieval unit 52 includes media session handler (MSH) unit 100 and media application 112.

In this example, MSH unit 100 further includes reception unit 106, cache 104, and proxy server unit 102. In this example, reception unit 106 is configured to receive data via a communication standard, such as 3GPP, 5G, or the like. In some examples, reception unit 106 may receive media data via a file delivery protocol, e.g., according to File Delivery over Unidirectional Transport (FLUTE), described in T. Paila et al., "FLUTE—File Delivery over Unidirectional Transport," Network Working Group, RFC 6726, November 2012, available at tools.ietf.org/html/rfc6726. That is, reception unit 106 may receive files via broadcast from, e.g., server device 60, which may act as a broadcast/multicast service center (BM-SC).

As MSH unit 100 receives data for media data (e.g., files), MSH unit 100 may store the received data in cache 104. Cache 104 may comprise a computer-readable storage medium, such as flash memory, a hard disk, RAM, or any other suitable storage medium.

Proxy server unit 102 may act as a server for providing media data from cache 104 to media application 112. For example, proxy server unit 102 may provide a MPD file or other manifest file to media application 112 or an intermediate application, such as a DASH client. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, media application 112 or an intermediate application may request segments from proxy server unit 102 using, e.g., HTTP GET or partial GET requests. For example, for a segment available from link http://127.0.0.1/rep1/seg3, media application 112 may construct an HTTP GET request that includes a request for http://127.0.0.1/rep1/seg3, and submit the request to proxy server unit 102. Proxy server unit 102 may retrieve requested media data from cache 104 and provide the data to media application 112 in response to such requests.

In accordance with the techniques of this disclosure, media application 112 may correspond to a media or streaming application that interacts with MSH unit 100 to retrieve media data according to a background data transfer. In the example shown in FIG. 2, MSH unit 100 may retrieve the media data according to the background data transfer to retrieve and store media data, e.g., in cache 104.

In other examples, MSH unit 100 may alert media application 112 of a BDT opportunity, and media application 112 may retrieve the media data according to the background data transfer.

Assuming for purposes of example that MSH unit 100 retrieves the media data from, e.g., server device 60, according to the background data transfer, MSH unit 100 may generally determine a time at which to retrieve the media data. For example, MSH unit 100 may receive data representing an off-peak designated time window during which to retrieve the media data. For example, media application 112 may initially send a request to MSH unit 100 indicating that particular media data is to be requested and transferred according to a background data transfer. MSH unit 100 may then send data of the request to a 5G Media Streaming downlink (5GMSd) Application Function (AF) or other media streaming application function, e.g., executed by server device 60 or another unit of network 74.

The 5GMSd AF may respond to MSH unit 100 with a notification of a background data transfer opportunity. The notification may include data defining the off-peak designated time window. Thus, MSH unit 100 (or in some examples, media application 112) may retrieve the media data during the off-peak designated time window. For examples in which media application 112 is to retrieve the media data, MSH unit 100 may send the data defining the off-peak designated time window from the notification to media application 112.

In the example of FIG. 2, MSH unit 100 may store the media data retrieved according to the background data transfer in cache 104. MSH unit 100 may store this media data in cache 104 until a later time, e.g., a time at which the user desires to observe playback of the media data. In some examples, the media data may be locked until a later time, such that MSH unit 100 may prevent access to the media data until a subsequent time. For example, the media data may correspond to an as-yet unreleased movie. Thus, MSH unit 100 may retrieve the media data in advance of a release date of the media data, and prevent access to the retrieved media data until a date and time of release. The release date and time may be specified in the indication of the background data transfer opportunity in some examples.

Figure 3:
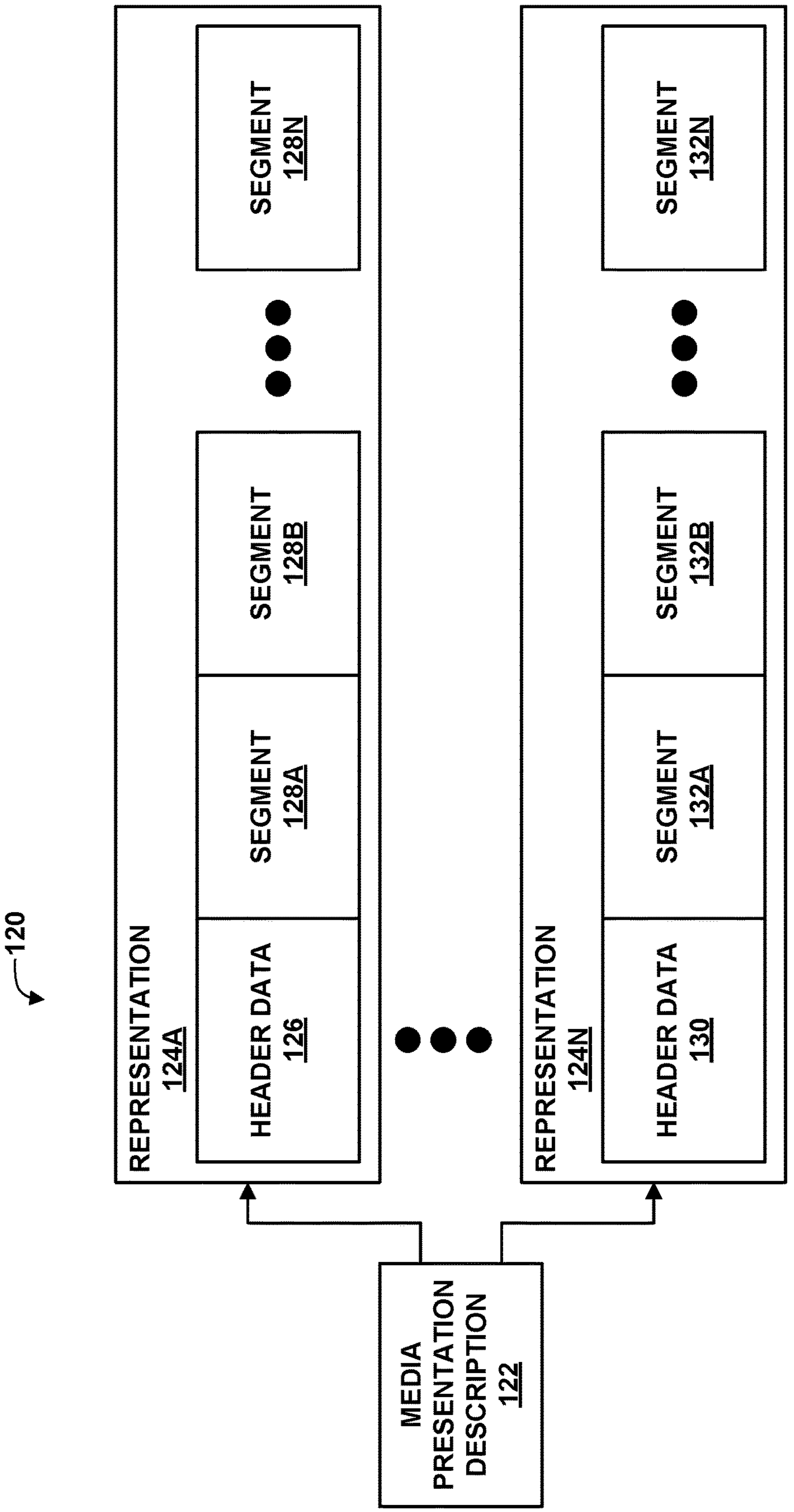
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
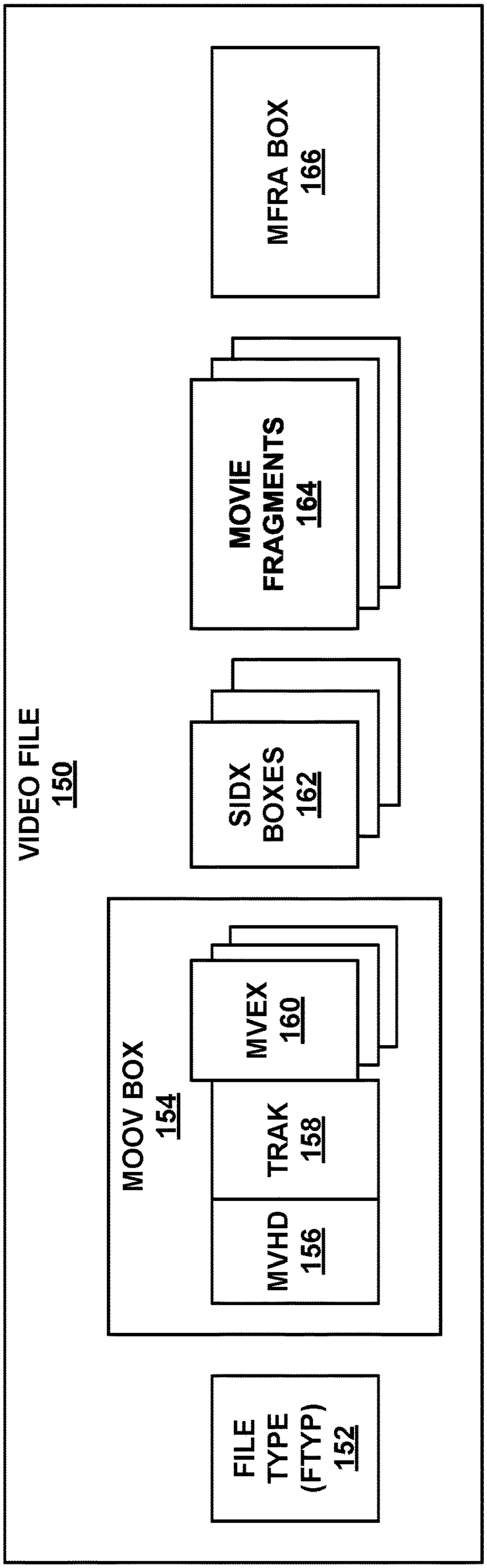
FIG. 4 is a block diagram illustrating elements of an example video file, which may correspond to a segment of a representation.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragment boxes 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragment boxes 164, e.g., to signal that video file 150 includes movie fragment boxes 164, in addition to video data included within MOOV box 154, if any. In the context of streaming video data, coded video pictures may be included in movie fragment boxes 164 rather than in MOOV box 154. Accordingly, all coded video samples may be included in movie fragment boxes 164, rather than in MOOV box 154.

MOOV box 154 may include a number of MVEX boxes 160 equal to the number of movie fragment boxes 164 in video file 150. Each of MVEX boxes 160 may describe characteristics of a corresponding one of movie fragment boxes 164. For example, each MVEX box may include a movie extends header box (MEHD) box that describes a temporal duration for the corresponding one of movie fragment boxes 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragment boxes 164. Encapsulation unit 30 may further signal the presence of a sequence data set and/or sequence level SEI messages as being present in one of movie fragment boxes 164 within the one of MVEX boxes 160 corresponding to the one of movie fragment boxes 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragment boxes 164 may include one or more coded video pictures. In some examples, movie fragment boxes 164 may include one or more groups of pictures (GOPs), each of which may include a number of coded video pictures, e.g., frames or pictures. In addition, as described above, movie fragment boxes 164 may include sequence data sets in some examples. Each of movie fragment boxes 164 may include a movie fragment header box (MFHD, not shown in FIG. 4). The MFHD box may describe characteristics of the corresponding movie fragment, such as a sequence number for the movie fragment. Movie fragment boxes 164 may be included in order of sequence number in video file 150.

MFRA box 166 may describe random access points within movie fragment boxes 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragment boxes 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
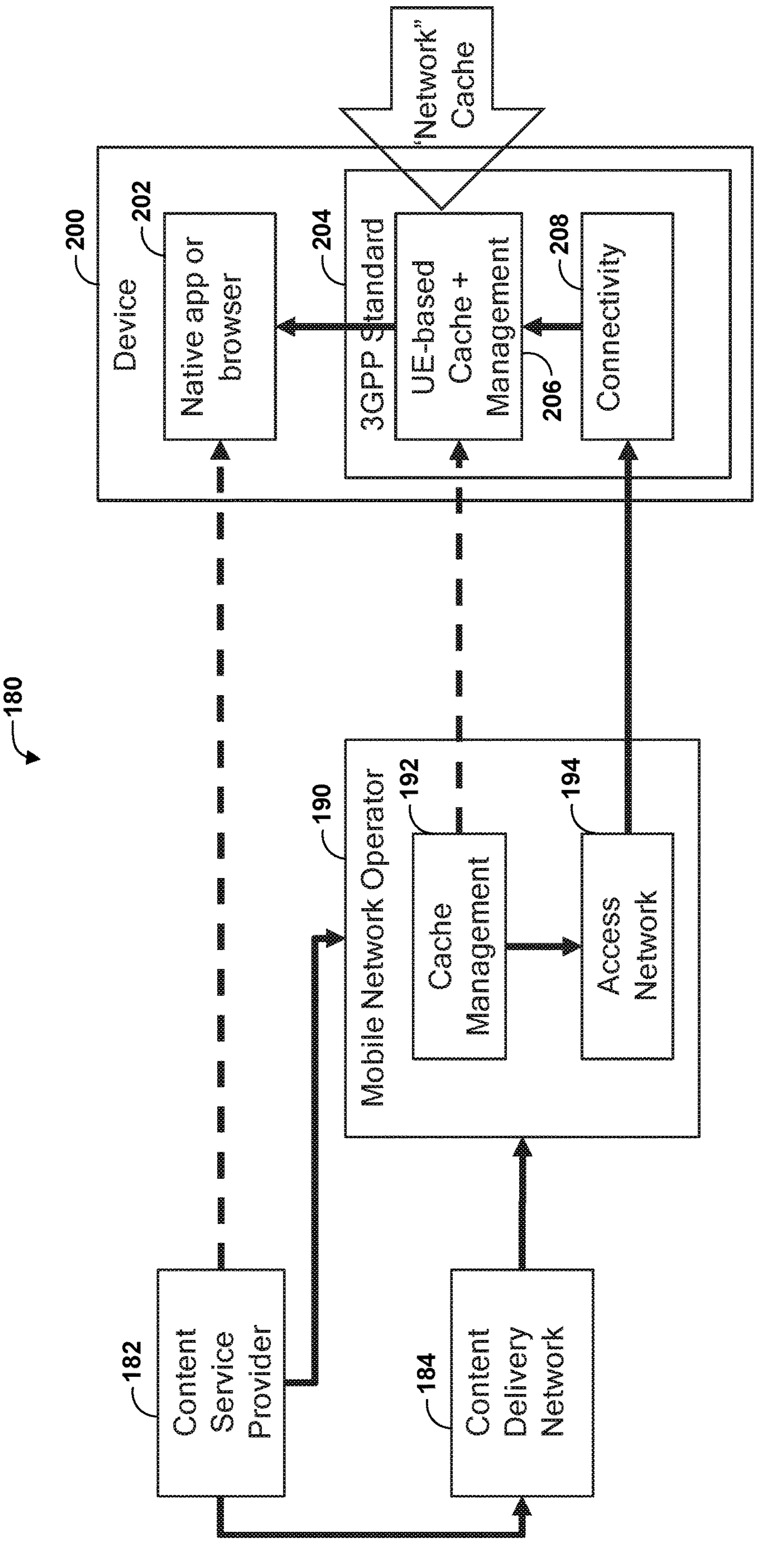
FIG. 5 is a block diagram illustrating an example system that may perform the techniques of this disclosure.

FIG. 5 is a block diagram illustrating an example system 180 that may perform the techniques of this disclosure. In this example, system 180 includes content service provider 182 (which may correspond to content preparation device 20 of FIG. 1), content delivery network 184 (which may include server device 60 of FIG. 1), mobile network operator (MNO) 190 (which may be included in network 74 of FIG. 1), and client device 200 (which may correspond to client device 40 of FIG. 1). In the example of FIG. 5, MNO 190 includes cache management unit 192 and access network unit 194, and client device 200 includes native application or browser 202 (which may include a web browser, a web browser plug-in, and/or other media player application or media streaming application), and 3GPP standard units 204, including UE-based cache and management unit 206 and connectivity unit 208.

In this example, native application or browser 202 may act as a streaming application or media player application (e.g., corresponding to media application 112 of FIG. 2, and may further include a DASH client), and 3GPP standard units 204 may act as a media session handler (MSH). Client device 200 may include an application programming interface (API), such as an M6 API, between native application or browser 202 and 3GPP standard units 204. The M6 API may be extended to include a new configuration element representing background data transfer, such as "_backgroundTraffic" or "_backgroundDownload." The API may cover both downlink and uplink commands and data transfer. The M6 API may include the API calls of registerBDT( ) or registerDownload( ) and registerUplink( ) which registers a request for a downlink/uplink background data transfer. Parameters may include a list of files, file sizes, a desired time, and/or a flag that indicates whether the MSH or the application will do the download.

The M6 API may also include a notifyBDTOpportunity( ) API call. The MSH (e.g., of 3GPP standard units 204) may use this callback function to notify media player application of native application or browser 202 of the opportunity to perform the download. Parameters may include the total traffic volume allocated for this session, the bitrate allocated for the session, and the time window to perform the download.

The M6 API may further include a notifyBDTComplete( ) API call. If the register request indicates that the MSH is to perform the download, the MSH may use this call to notify the media player application that the download is complete. Parameters may include the location of the downloaded content, the size of the downloaded content, and the cache duration for the content.

In some examples, the MSH may receive a special link to perform the download, for enhanced security. Also for security, the content may be subject to an additional encryption step, with a special key that is only available to the media player application. Furthermore, for extra security, the application provider may distribute a group key to all applications that will perform a BDT download.

The MSH may allow leasing of cache space in some examples. The application provider may lease a certain amount of disk space on the UEs for caching BDT downloaded content. The amount of space may differ between UEs, but the amount may be discoverable by the media player application.

There may also be various BDT policy features. For example, the application provider may define multiple policies and tag them with one or more feature tags. The feature tags may be used to differentiate media quality, e.g., 4 K vs. FHD vs. HD. The 5G Media Streaming downlink (5GMSd) Application Function (AF) may keep track of consumption quotas and downgrade to a lower policy if a quota is exceeded.

Figure 6:
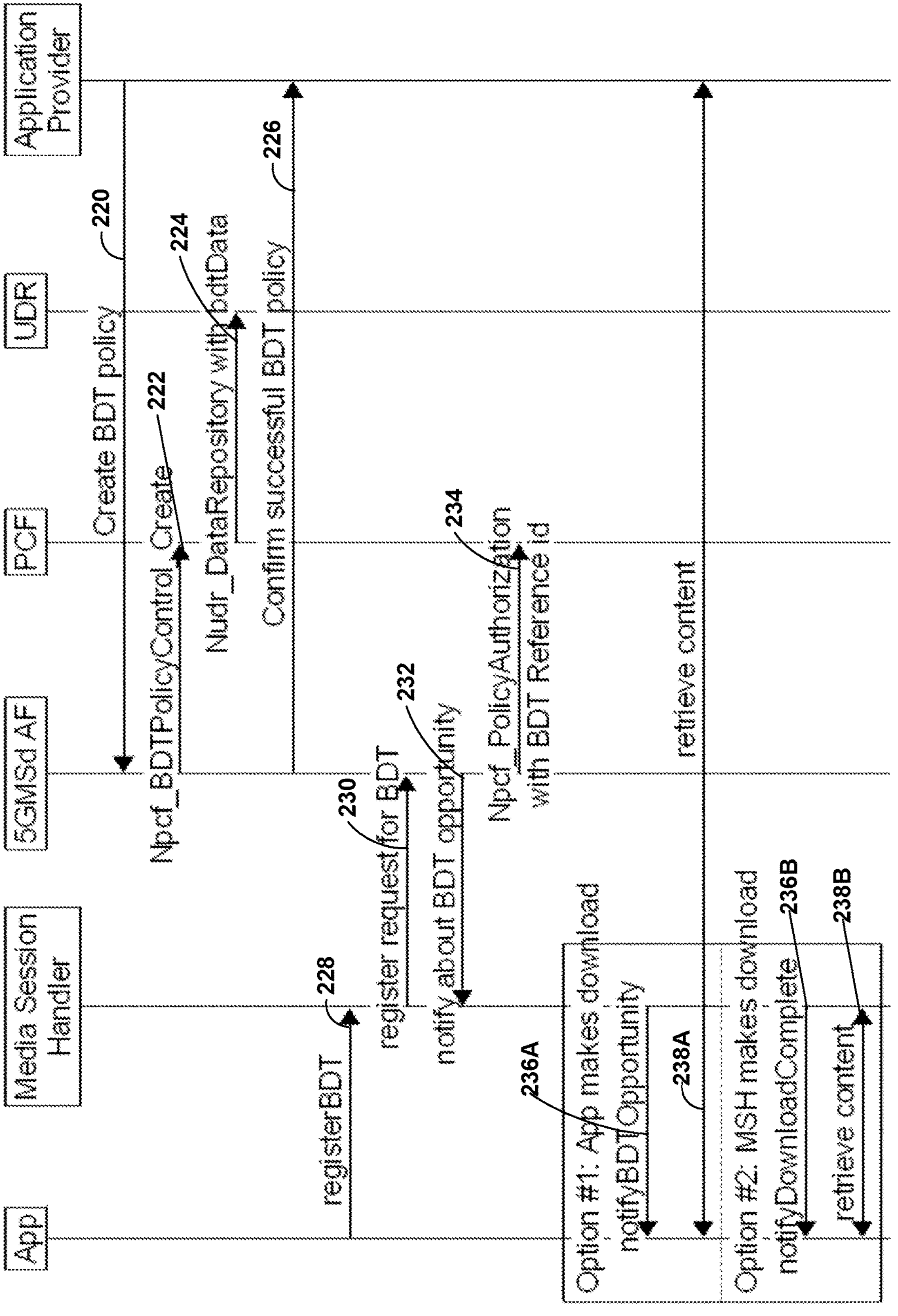
FIG. 6 is a flowchart illustrating an example method for transporting media data using a background data transfer according to the techniques of this disclosure.

FIG. 6 is a flowchart illustrating an example method for transporting media data using a background data transfer according to the techniques of this disclosure. The method of FIG. 6 is explained with respect to the elements of FIGS. 1 and 2, although it should be understood that other devices, such as the devices of FIG. 5, may also be configured to perform the techniques of this disclosure.

In some examples according to the techniques of this disclosure, content preparation device 20 and/or server device 60 may provision background data transfer (BDT) configuration with a 5G Media Streaming downlink (5GMSd) Application Function (AF). Provisioning such a configuration may include providing, to the 5GMSd AF, information about overall data volume for media data, a list of user equipment (UEs), a data budget per UE, one or more geographical areas, and/or the like (220). The 5GMSd AF may contact a device that provides a policy and charging function (PCF) to create a new BDT policy (222). The PCF device may reply to a unified data repository (UDR) with a BDT reference ID for the policy (224). The 5GMSd AF may then confirm that a successful BDT policy has been created (226) to the application provider.

Client device 40 may execute a media player application and a media session handler (MSH). The media player application may provide data to the MSH about background data transfer needs and register a background data transfer request (228). For example, the media player application may provide a list of files, their corresponding sizes, and a desired availability time to the MSH. The media player application may, in various examples, request that the MSH perform the download using the background data transfer, or the media player application may request notification about a download opportunity and perform the download itself. The MSH may provide a location of the download to the media player application after the MSH performs the download, if the MSH itself performs the download.

The MSH may register a request with the 5GMSd AF for a BDT download opportunity (230). The MSH may then provide an application provider identifier or domain name and a UE identifier (such as a generic public subscription identifier (GPSI)). The 5GMSd AF may inform the MSH when a BDT download opportunity is available (232). The 5GMSd AF may also verify the existence of an appropriate BDT policy for that application provider and UE. The 5GMSd AF may query a unified data repository (UDR) directly to verify the existence of the BDT policy (234). If the BDT policy is found, the 5GMSd AF may identify the BDT reference ID, time window, data limits per UE, total data, and the like. The MSH may then perform the download or trigger the media player application to perform the download. The MSH may also receive data representing remaining quotas for download.

In particular, in one example, the MSH sends a notification to the media player application that a background data transfer opportunity is available (236A). In response, the media player application retrieves media data content from the application provider directly (238A). In another example, the MSH itself retrieves the media data and then sends a notification to the media player application when the media data retrieval has completed (fully or partially) (236B). In response, the media player application retrieves the media data from the MSH (238B).

In this manner, the method of FIG. 6 represents an example of a method including sending, by one or more processors of a client device, a request to retrieve media data according to a background data transfer to a media streaming application function (AF); in response to the request, receiving, by the one or more processors of the client device, an indication of a background data transfer opportunity from the media streaming AF; in response to the indication of the background data transfer opportunity, retrieving, by the one or more processors, the media data according to the background data transfer; and storing, by the one or more processors, the retrieved media data.

As discussed above, this disclosure describes a framework that may be used to perform background data transfer for, e.g., 5G media delivery. This framework may seamlessly integrate with existing 5G media streaming architecture. These techniques may also allow an MNO to keep control of data volume and download windows. These techniques may also be secure and provide opportunistic retrieval of media content.

Application providers and MNOs may be likely to encourage use of these techniques to reduce costs and offload traffic to less-busy time windows. These techniques may be implemented as part of a media session handler service, which could be part of a protocol stack of a modem. These techniques may also be incorporated into the 5G standard.

Figure 7:
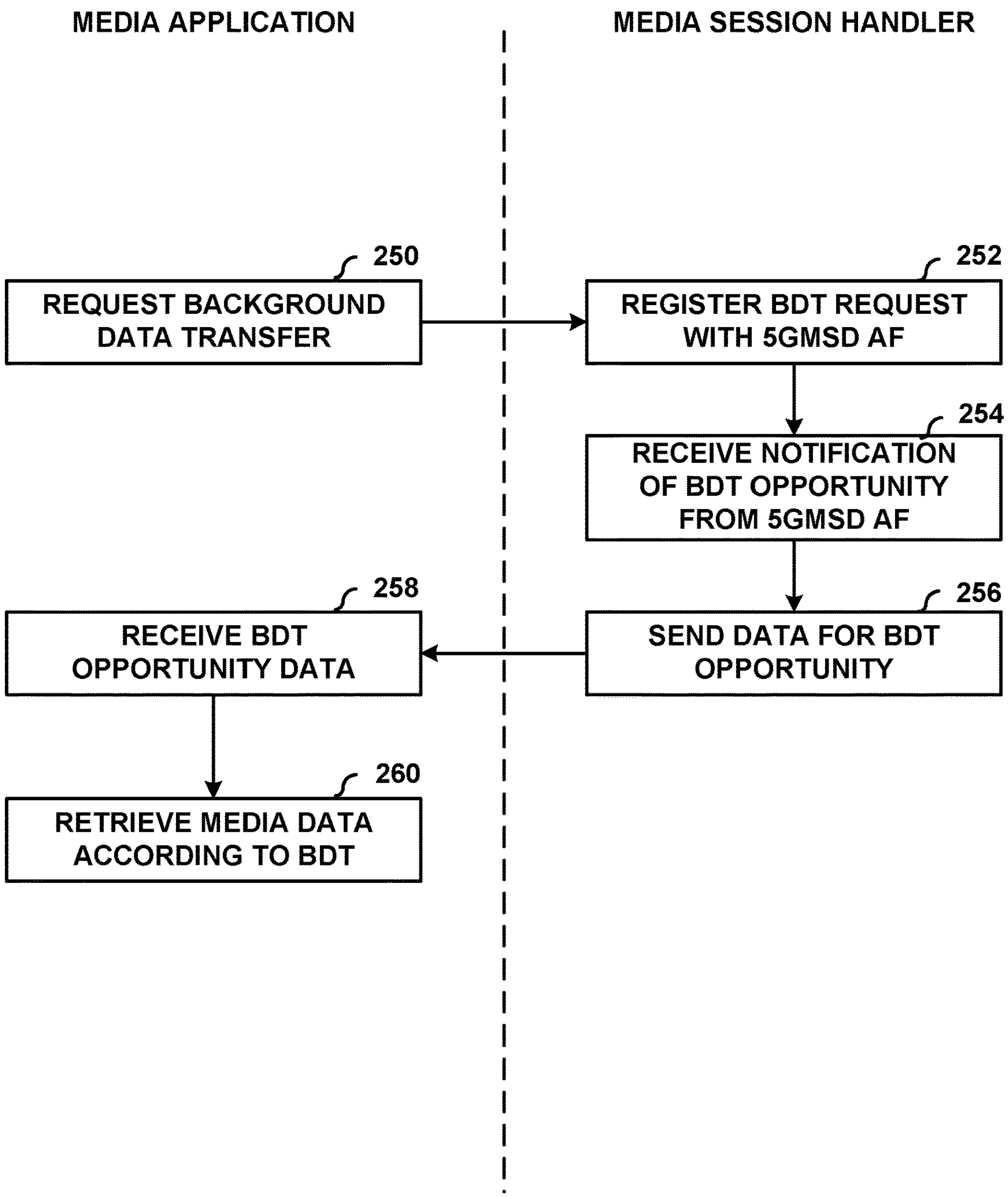
FIG. 7 is a flowchart illustrating an example method of retrieving media data according to the techniques of this disclosure.

FIG. 7 is a flowchart illustrating an example method of retrieving media data according to the techniques of this disclosure. The method of FIG. 7 is explained with respect to client device 40 of FIG. 1. Other devices may be configured to perform this or a similar method, such as client device 200 of FIG. 5. Retrieval unit 52 of client device 40 of FIG. 1 may include both a media application and a media session handler (MSH), e.g., as shown in FIG. 2. The media application and the MSH of retrieval unit 52 of client device 40 of FIG. 1 may perform the various elements of FIG. 7 discussed below.

Initially, the media application may request a background data transfer (250), e.g., for a particular media presentation. The media application may send the request to the MSH. In response, the MSH may register the background data transfer request with the 5GMSd AF (252). The MSH may subsequently receive a notification of a background data transfer opportunity from the 5GMSd AF (254). The notification may include data representing a time at which media data of the media presentation can be retrieved according to the background data transfer.

In the example of FIG. 7, the MSH may send data for the background data transfer opportunity to the media application (256). The data may indicate, for example, the time at which the media data of the media presentation can be retrieved according to the background data transfer. The media application may receive the background data transfer opportunity data (258) and then retrieve the media data according to the background data transfer (260). For example, the media application may retrieve the media data at the indicated time. The indicated time may correspond to an off-peak designated time window.

In this manner, the method of FIG. 7 represents an example of a method including sending, by one or more processors of a client device, a request to retrieve media data according to a background data transfer to a media streaming application function (AF); in response to the request, receiving, by the one or more processors of the client device, an indication of a background data transfer opportunity from the media streaming AF; in response to the indication of the background data transfer opportunity, retrieving, by the one or more processors, the media data according to the background data transfer; and storing, by the one or more processors, the retrieved media data.

Figure 8:
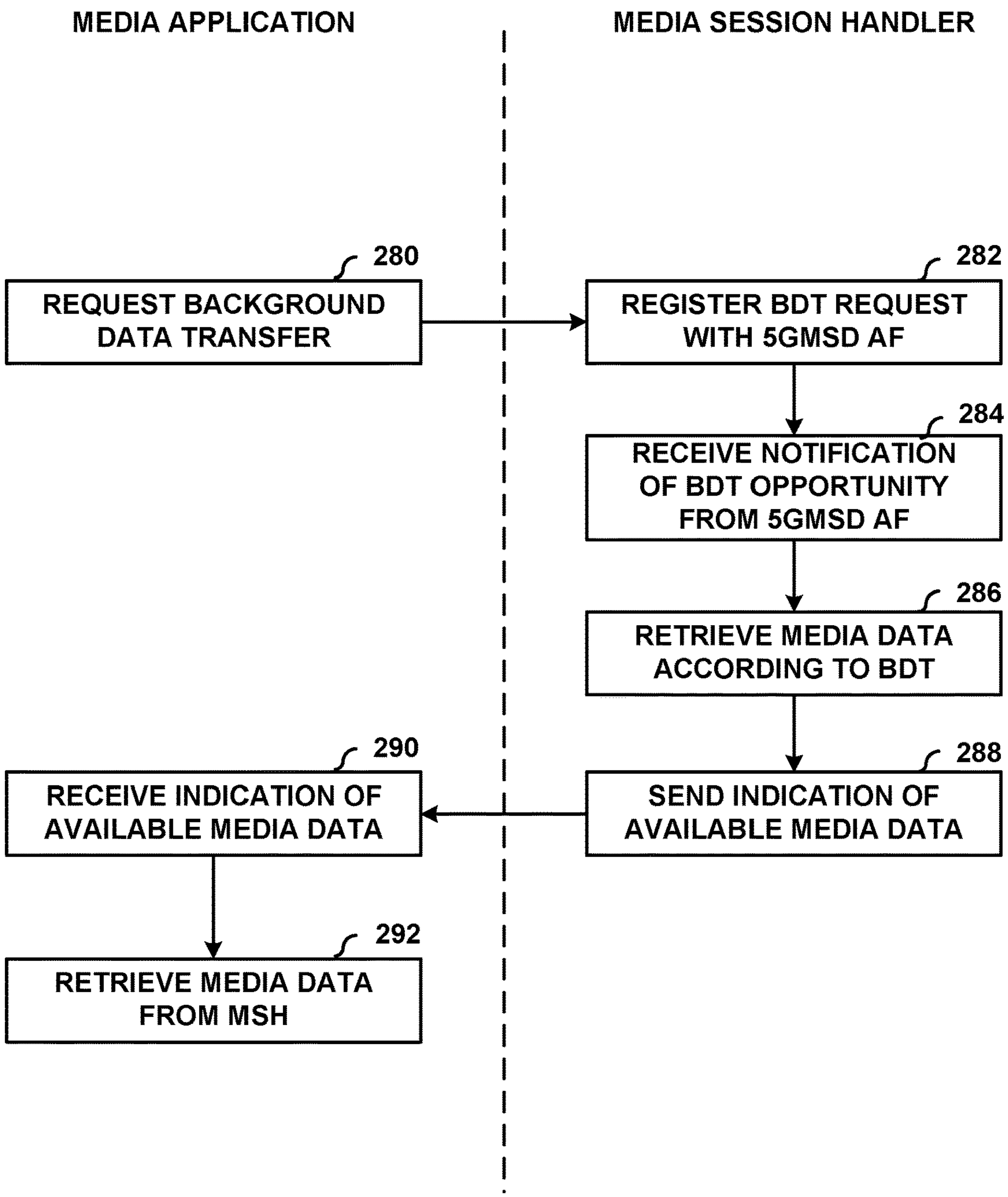
FIG. 8 is a flowchart illustrating another example method of retrieving media data according to the techniques of this disclosure.

FIG. 8 is a flowchart illustrating another example method of retrieving media data according to the techniques of this disclosure. The method of FIG. 8 is explained with respect to client device 40 of FIG. 1. Other devices may be configured to perform this or a similar method, such as client device 200 of FIG. 5. Retrieval unit 52 of client device 40 of FIG. 1 may include both a media application and a media session handler (MSH), e.g., as shown in FIG. 2. The media application and the MSH of retrieval unit 52 of client device 40 of FIG. 1 may perform the various elements of FIG. 8 discussed below.

Initially, the media application may request a background data transfer (280), e.g., for a particular media presentation. The media application may send the request to the MSH. In response, the MSH may register the background data transfer request with the 5GMSd AF (282). The MSH may subsequently receive a notification of a background data transfer opportunity from the 5GMSd AF (284). The notification may include data representing a time at which media data of the media presentation can be retrieved according to the background data transfer.

In the example of FIG. 8, the MSH may then retrieve the media data according to the background data transfer (286). For example, the MSH may retrieve the media data at the time indicated in the notification. The indicated time may correspond to an off-peak designated time window. After retrieving some or all of the media data for the media presentation, the MSH may send data indicating that the media data has been retrieved and is available to the media application (288).

The media application may receive the indication of the media data being available from the MSH (290). In response, at some time later, the media application may retrieve the media data from the MSH (292).

In this manner, the method of FIG. 8 represents an example of a method including sending, by one or more processors of a client device, a request to retrieve media data according to a background data transfer to a media streaming application function (AF); in response to the request, receiving, by the one or more processors of the client device, an indication of a background data transfer opportunity from the media streaming AF; in response to the indication of the background data transfer opportunity, retrieving, by the one or more processors, the media data according to the background data transfer; and storing, by the one or more processors, the retrieved media data.

Various examples of the techniques of this disclosure are summarized in the following clauses:

Clause 1: A method of retrieving media data, the method comprising: sending a request to retrieve media data using background data transfer; in response to the request, receiving an indication of a background data transfer opportunity; in response to the indication of the background data transfer opportunity, retrieving the media data using the background data transfer; and storing the retrieved media data.

Clause 2: The method of clause 1, wherein retrieving the media data using the background data transfer comprises retrieving the media data during an off-peak designated time window.

Clause 3: The method of clause 2, wherein the indication of the background data transfer opportunity comprises data defining the off-peak designated time window.

Clause 4: The method of any of clauses 1-3, wherein sending the request to retrieve media data using the background data transfer comprises sending, by a media session handler executed by a client device, the request to retrieve the media data using the background data transfer to a 5G Media Streaming downlink (5GMSd) Application Function (AF).

Clause 5: The method of any of clauses 1-4, wherein receiving the indication of the background data transfer opportunity comprises receiving, by a media session handler executed by a client device, a notification of the background data transfer opportunity.

Clause 6: The method of clause 5, further comprising sending, by the media session handler, data representative of the background data transfer to a media player application executed by the client device, wherein retrieving the media data comprises retrieving, by the media player application, the media data using the background data transfer.

Clause 7: The method of clause 5, wherein retrieving the media data using the background data transfer comprises retrieving, by the media session handler, the media data using the background data transfer, the method further comprising: sending, by the media session handler, data indicating that the media data has been retrieved to a media player application executed by the client device; and sending, by the media session handler, the retrieved data to the media player application.

Clause 8: The method of any of clauses 1-7, wherein sending the request comprises sending at least one of a list of one or more files of the media data to be retrieved, sizes of the one or more files, or a desired availability time for the background data transfer.

Clause 9: A device for retrieving media data, the device comprising one or more means for performing the method of any of clauses 1-8.

Clause 10: The device of clause 9, wherein the one or more means comprise one or more processors implemented in circuitry.

Clause 11: A computer-readable storage medium having stored thereon instructions that, when executed, cause a processor to perform the method of any of clauses 1-8.

Clause 12: A device for retrieving media data, the device comprising: means for sending a request to retrieve media data using background data transfer; means for receiving, in response to the request, an indication of a background data transfer opportunity; means for retrieving, in response to the indication of the background data transfer opportunity, the media data using the background data transfer; and means for storing the retrieved media data.

Clause 13: A method of retrieving media data, the method comprising: sending, by one or more processors of a client device, a request to retrieve media data according to a background data transfer to a media streaming application function (AF); in response to the request, receiving, by the one or more processors of the client device, an indication of a background data transfer opportunity from the media streaming AF; in response to the indication of the background data transfer opportunity, retrieving, by the one or more processors, the media data according to the background data transfer; and storing, by the one or more processors, the retrieved media data.

Clause 14: The method of clause 13, wherein retrieving the media data according to the background data transfer comprises: determining an off-peak designated time window; and retrieving the media data during the off-peak designated time window.

Clause 15: The method of clause 14, wherein determining the off-peak designated time window comprises determining the off-peak designated time window from data defining the off-peak designated time window included in the indication of the background data transfer opportunity.

Clause 16: The method of clause 13, wherein sending the request to retrieve media data according to the background data transfer comprises sending, by a media session handler (MSH) executed by the one or more processors of the client device, the request to retrieve the media data according to the background data transfer to a 5G Media Streaming downlink (5GMSd) Application Function (AF).

Clause 17: The method of clause 13, wherein receiving the indication of the background data transfer opportunity comprises receiving, by a media session handler (MSH) executed by the one or more processors of the client device, a notification of the background data transfer opportunity.

Clause 18: The method of clause 17, further comprising sending, by the MSH, data representative of the background data transfer to a media player application executed by the one or more processors of the client device, wherein retrieving the media data comprises retrieving, by the media player application executed by the one or more processors of the client device, the media data according to the background data transfer.

Clause 19: The method of clause 17, wherein retrieving the media data according to the background data transfer comprises retrieving, by the MSH executed by the one or more processors of the client device, the media data according to the background data transfer, the method further comprising: sending, by the MSH executed by the one or more processors of the client device, data indicating that the media data has been retrieved to a media player application executed by the one or more processors of the client device; and sending, by the MSH executed by the one or more processors of the client device, the retrieved data to the media player application.

Clause 20: The method of clause 13, further comprising forming the request to include at least one of a list of one or more files of the media data to be retrieved, sizes of the one or more files, or a desired availability time for the background data transfer.

Clause 21: A device for retrieving media data, the device comprising: a memory configured to store media data; and one or more processors implemented in circuitry and configured to: send a request to retrieve media data according to a background data transfer to a media streaming application function (AF); in response to the request, receive an indication of a background data transfer opportunity from the media streaming AF; in response to the indication of the background data transfer opportunity, retrieve the media data according to the background data transfer; and store the retrieved media data to the memory.

Clause 22: The device of clause 21, wherein to retrieve the media data according to the background data transfer, the one or more processors are configured to: determine an off-peak designated time window; and retrieve the media data during the off-peak designated time window.

Clause 23: The device of clause 22, wherein the one or more processors are configured to determine the off-peak designated time window from data defining the off-peak designated time window included in the indication of the background data transfer opportunity.

Clause 24: The device of clause 21, wherein to send the request to retrieve media data according to the background data transfer, the one or more processors are configured to execute a media session handler (MSH) configured to send the request to retrieve the media data according to the background data transfer to a 5G Media Streaming downlink (5GMSd) Application Function (AF).

Clause 25: The device of clause 21, wherein to receive the indication of the background data transfer opportunity, the one or more processors are configured to execute a media session handler (MSH) configured to receive a notification of the background data transfer opportunity.

Clause 26: The device of clause 25, wherein the MSH is further configured to send data representative of the background data transfer to a media player application executed by the one or more processors, and wherein to retrieve the media data, the media player application is configured to retrieve the media data according to the background data transfer.

Clause 27: The device of clause 25, wherein to retrieve the media data according to the background data transfer, the MSH is configured to retrieve the media data according to the background data transfer, and wherein the MSH is further configured to: send data indicating that the media data has been retrieved to a media player application executed by the one or more processors of the client device; and send the retrieved data to the media player application.

Clause 28: The device of clause 21, wherein the one or more processors are further configured to form the request to include at least one of a list of one or more files of the media data to be retrieved, sizes of the one or more files, or a desired availability time for the background data transfer.

Clause 29: A computer-readable storage medium having stored thereon instructions that, when executed, cause one or more processors of a client device to: send a request to retrieve media data according to a background data transfer to a media streaming application function (AF); in response to the request, receive an indication of a background data transfer opportunity from the media streaming AF; in response to the indication of the background data transfer opportunity, retrieve the media data according to the background data transfer; and store the retrieved media data to the memory.

Clause 30: The computer-readable storage medium of clause 29, wherein the instructions that cause the processor to retrieve the media data according to the background data transfer comprise instructions that cause the processor to: determine an off-peak designated time window; and retrieve the media data during the off-peak designated time window.

Clause 31: The computer-readable storage medium of clause 30, wherein the instructions that cause the processor to determine the off-peak designated time window comprise instructions that cause the processor to determine the off-peak designated time window from data defining the off-peak designated time window included in the indication of the background data transfer opportunity.

Clause 32: The computer-readable storage medium of clause 29, wherein the instructions that cause the processor to send the request to retrieve media data according to the background data transfer comprise instructions that cause the processor to execute a media session handler (MSH) to send the request to retrieve the media data according to the background data transfer to a 5G Media Streaming downlink (5GMSd) Application Function (AF).

Clause 33: The computer-readable storage medium of clause 29, wherein the instructions that cause the processor to receive the indication of the background data transfer opportunity comprise instructions that cause the processor to execute a media session handler (MSH) to receive a notification of the background data transfer opportunity.

Clause 34: The computer-readable storage medium of clause 33, further comprising instructions that cause the processor to execute the MSH to send data representative of the background data transfer to a media player application executed by the one or more processors of the client device, wherein the instructions that cause the processor to retrieve the media data comprise instructions that cause the processor to execute the media player application to retrieve the media data according to the background data transfer.

Clause 35: The computer-readable storage medium of clause 33, wherein the instructions that cause the processor to retrieve the media data according to the background data transfer comprise instructions that cause the processor to execute the MSH to retrieve the media data according to the background data transfer, further comprising instructions that cause the processor to: execute the MSH to send data indicating that the media data has been retrieved to a media player application executed by the one or more processors of the client device; and execute the MSH to send the retrieved data to the media player application.

Clause 36: The computer-readable storage medium of clause 29, further comprising forming the request to include at least one of a list of one or more files of the media data to be retrieved, sizes of the one or more files, or a desired availability time for the background data transfer.

Clause 37: A device for retrieving media data, the device comprising: means for sending a request to retrieve media data according to background data transfer; means for receiving, in response to the request, an indication of a background data transfer opportunity; means for retrieving, in response to the indication of the background data transfer opportunity, the media data according to the background data transfer; and means for storing the retrieved media data.

Clause 38: A method of retrieving media data, the method comprising: sending, by one or more processors of a client device, a request to retrieve media data according to a background data transfer to a media streaming application function (AF); in response to the request, receiving, by the one or more processors of the client device, an indication of a background data transfer opportunity from the media streaming AF; in response to the indication of the background data transfer opportunity, retrieving, by the one or more processors, the media data according to the background data transfer; and storing, by the one or more processors, the retrieved media data.

Clause 39: The method of clause 38, wherein retrieving the media data according to the background data transfer comprises: determining an off-peak designated time window; and retrieving the media data during the off-peak designated time window.

Clause 40: The method of clause 39, wherein determining the off-peak designated time window comprises determining the off-peak designated time window from data defining the off-peak designated time window included in the indication of the background data transfer opportunity.

Clause 41: The method of any of clauses 38-40, wherein sending the request to retrieve media data according to the background data transfer comprises sending, by a media session handler (MSH) executed by the one or more processors of the client device, the request to retrieve the media data according to the background data transfer to a 5G Media Streaming downlink (5GMSd) Application Function (AF).

Clause 42: The method of any of clauses 38-41, wherein receiving the indication of the background data transfer opportunity comprises receiving, by a media session handler (MSH) executed by the one or more processors of the client device, a notification of the background data transfer opportunity.

Clause 43: The method of clause 42, further comprising sending, by the MSH, data representative of the background data transfer to a media player application executed by the one or more processors of the client device, wherein retrieving the media data comprises retrieving, by the media player application executed by the one or more processors of the client device, the media data according to the background data transfer.

Clause 44: The method of clause 42, wherein retrieving the media data according to the background data transfer comprises retrieving, by the MSH executed by the one or more processors of the client device, the media data according to the background data transfer, the method further comprising: sending, by the MSH executed by the one or more processors of the client device, data indicating that the media data has been retrieved to a media player application executed by the one or more processors of the client device; and sending, by the MSH executed by the one or more processors of the client device, the retrieved data to the media player application.

Clause 45: The method of any of clauses 38-44, further comprising forming the request to include at least one of a list of one or more files of the media data to be retrieved, sizes of the one or more files, or a desired availability time for the background data transfer.

Clause 46: A device for retrieving media data, the device comprising: a memory configured to store media data; and one or more processors implemented in circuitry and configured to: send a request to retrieve media data according to a background data transfer to a media streaming application function (AF); in response to the request, receive an indication of a background data transfer opportunity from the media streaming AF; in response to the indication of the background data transfer opportunity, retrieve the media data according to the background data transfer; and store the retrieved media data to the memory.

Clause 47: The device of clause 46, wherein to retrieve the media data according to the background data transfer, the one or more processors are configured to: determine an off-peak designated time window; and retrieve the media data during the off-peak designated time window.

Clause 48: The device of clause 47, wherein the one or more processors are configured to determine the off-peak designated time window from data defining the off-peak designated time window included in the indication of the background data transfer opportunity.

Clause 49: The device of any of clauses 46-48, wherein to send the request to retrieve media data according to the background data transfer, the one or more processors are configured to execute a media session handler (MSH) configured to send the request to retrieve the media data according to the background data transfer to a 5G Media Streaming downlink (5GMSd) Application Function (AF).

Clause 50: The device of any of clauses 38-49, wherein to receive the indication of the background data transfer opportunity, the one or more processors are configured to execute a media session handler (MSH) configured to receive a notification of the background data transfer opportunity.

Clause 51: The device of clause 50, wherein the MSH is further configured to send data representative of the background data transfer to a media player application executed by the one or more processors, and wherein to retrieve the media data, the media player application is configured to retrieve the media data according to the background data transfer.

Clause 52: The device of clause 50, wherein to retrieve the media data according to the background data transfer, the MSH is configured to retrieve the media data according to the background data transfer, and wherein the MSH is further configured to: send data indicating that the media data has been retrieved to a media player application executed by the one or more processors of the client device; and send the retrieved data to the media player application.

Clause 53: The device of any of clauses 38-52, wherein the one or more processors are further configured to form the request to include at least one of a list of one or more files of the media data to be retrieved, sizes of the one or more files, or a desired availability time for the background data transfer.

Clause 54: A computer-readable storage medium having stored thereon instructions that, when executed, cause one or more processors of a client device to: send a request to retrieve media data according to a background data transfer to a media streaming application function (AF); in response to the request, receive an indication of a background data transfer opportunity from the media streaming AF; in response to the indication of the background data transfer opportunity, retrieve the media data according to the background data transfer; and store the retrieved media data to the memory.

Clause 55: The computer-readable storage medium of clause 54, wherein the instructions that cause the processor to retrieve the media data according to the background data transfer comprise instructions that cause the processor to: determine an off-peak designated time window; and retrieve the media data during the off-peak designated time window.

Clause 56: The computer-readable storage medium of clause 55, wherein the instructions that cause the processor to determine the off-peak designated time window comprise instructions that cause the processor to determine the off-peak designated time window from data defining the off-peak designated time window included in the indication of the background data transfer opportunity.

Clause 57: The computer-readable storage medium of any of clauses 54-56, wherein the instructions that cause the processor to send the request to retrieve media data according to the background data transfer comprise instructions that cause the processor to execute a media session handler (MSH) to send the request to retrieve the media data according to the background data transfer to a 5G Media Streaming downlink (5GMSd) Application Function (AF).

Clause 58: The computer-readable storage medium of any of clauses 54-57, wherein the instructions that cause the processor to receive the indication of the background data transfer opportunity comprise instructions that cause the processor to execute a media session handler (MSH) to receive a notification of the background data transfer opportunity.

Clause 59: The computer-readable storage medium of clause 58, further comprising instructions that cause the processor to execute the MSH to send data representative of the background data transfer to a media player application executed by the one or more processors of the client device, wherein the instructions that cause the processor to retrieve the media data comprise instructions that cause the processor to execute the media player application to retrieve the media data according to the background data transfer.

Clause 60: The computer-readable storage medium of clause 58, wherein the instructions that cause the processor to retrieve the media data according to the background data transfer comprise instructions that cause the processor to execute the MSH to retrieve the media data according to the background data transfer, further comprising instructions that cause the processor to: execute the MSH to send data indicating that the media data has been retrieved to a media player application executed by the one or more processors of the client device; and execute the MSH to send the retrieved data to the media player application.

Clause 61: The computer-readable storage medium of any of clauses 54-60, further comprising forming the request to include at least one of a list of one or more files of the media data to be retrieved, sizes of the one or more files, or a desired availability time for the background data transfer.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:

receiving, by a media session handler (MSH) executed by one or more processors of a client device and from a media player application executed by the one or more processors of the client device via an application programming interface (API) between the media player application and the MSH, a first request to retrieve media data of a media presentation from an application provider, the first request indicating retrieval of the media data according to a background data transfer, wherein receiving the first request comprises receiving a call to a function provided by the API, the function comprising a function for requesting a download via background data transfer;

in response to the first request to retrieve the media data of the media presentation, sending, by the MSH of the client device, a second request to retrieve media data according to the background data transfer to a media streaming application function (AF);

in response to the second request, receiving, by the MSH of the client device, an indication, from the media streaming AF, of a background data transfer opportunity of the media data of the media presentation, the indication including a notification of the background data transfer opportunity;

sending, by the MSH of the client device, data representative of the background data transfer to the media player application executed by the one or more processors of the client device;

in response to the indication of the background data transfer opportunity, retrieving, by the media player executed by the one or more processors of the client device, the media data of the media presentation according to the background data transfer; and storing, by the one or more processors, the retrieved media data.

2. The method of claim 1, wherein retrieving the media data according to the background data transfer comprises:

determining an off-peak designated time window; and retrieving the media data during the off-peak designated time window.

3. The method of claim 2, wherein determining the off-peak designated time window comprises determining the off-peak designated time window from data defining the off-peak designated time window included in the indication of the background data transfer opportunity.

4. The method of claim 1, wherein the media streaming AF comprises a 5G Media Streaming downlink (5GMSd) Application Function (AF) and wherein sending the second request to retrieve the media data according to the background data transfer comprises sending, by the MSH of the client device, the second request to retrieve the media data according to the background data transfer to the 5GMSd AF.

5. The method of claim 1, further comprising forming the second request to include at least one of a list of one or more files of the media data to be retrieved, sizes of the one or more files, or a desired availability time for the background data transfer.

6. A method of retrieving media data, the method comprising:

receiving, by a media session handler (MSH) executed by one or more processors of a client device and from a media player application executed by the one or more processors of the client device via an application programming interface (API) between the media player application and the MSH, a first request to retrieve media data of a media presentation from an application provider, the first request indicating retrieval of the media data according to a background data transfer, wherein receiving the first request comprises receiving a call to a function provided by the API, the function comprising a function for requesting a download via background data transfer;

in response to the first request to retrieve the media data of the media presentation, sending, by the MSH of the client device, a second request to retrieve media data according to the background data transfer to a media streaming application function (AF);

in response to the second request, receiving, by the MSH of the client device, an indication of a background data transfer opportunity of the media data of the media presentation from the media streaming AF, the indication including a notification of the background data transfer opportunity;

in response to the notification of the background data transfer opportunity, retrieving, by the MSH executed by the one or more processors of the client device, the media data of the media presentation according to the background data transfer;

sending, by the MSH executed by the one or more processors of the client device, data indicating that the media data has been retrieved to the media player application executed by the one or more processors of the client device; and sending, by the MSH executed by the one or more processors of the client device, the retrieved data to the media player application.

7. A device for retrieving media data, the device comprising:

a memory configured to store media data; and one or more processors implemented in circuitry and configured to:

execute a media session handler (MSH) that is configured to:

receive, from a media player application executed by the one or more processors via an application programming interface (API) between the media player application and the MSH, a first request to retrieve media data of a media presentation from an application provider, the first request indicating retrieval of the media data according to a background data transfer, wherein receiving the first request comprises receiving a call to a function provided by the API, the function comprising a function for requesting a download via background data transfer, in response to the first request to retrieve the media data of the media presentation, send a second request to retrieve media data according to the background data transfer to a media streaming application function (AF), and in response to the second request, receive an indication, from the media streaming AF, of a background data transfer opportunity of the media data of the media presentation, the indication including a notification of the background data transfer opportunity; and send data representative of the indication of the background data transfer to the media player application executed by the one or more processors; and execute the media player application to:

in response to the indication of the background data transfer opportunity, retrieve the media data of the media presentation according to the background data transfer; and store the retrieved media data to the memory.

8. The device of claim 7, wherein to retrieve the media data according to the background data transfer, the one or more processors are configured to:

determine an off-peak designated time window; and retrieve the media data during the off-peak designated time window.

9. The device of claim 8, wherein the one or more processors are configured to determine the off-peak designated time window from data defining the off-peak designated time window included in the indication of the background data transfer opportunity.

10. The device of claim 7, wherein the media streaming AF comprises a 5G Media Streaming downlink (5GMSd) Application Function (AF) and wherein to send the second request to retrieve the media data according to the background data transfer, the MSH is further configured to send the second request to retrieve the media data according to the background data transfer to the 5GMSd AF.

11. The device of claim 7, wherein the one or more processors are further configured to form the second request to include at least one of a list of one or more files of the media data to be retrieved, sizes of the one or more files, or a desired availability time for the background data transfer.

12. A device for retrieving media data, the device comprising:

a memory configured to store media data; and one or more processors implemented in circuitry and configured to:

execute a media session handler (MSH) that is configured to:

receive, from a media player application executed by the one or more processors via an application programming interface (API) between the media player application and the MSH, a first request to retrieve media data of a media presentation from an application provider, the first request indicating retrieval of the media data according to a background data transfer, wherein receiving the first request comprises receiving a call to a function provided by the API, the function comprising a function for requesting a download via background data transfer, in response to the first request to retrieve the media data of the media presentation, send a second request to retrieve media data according to the background data transfer to a media streaming application function (AF), and in response to the second request, receive an indication, from the media streaming AF, of a background data transfer opportunity of the media data of the media presentation;

in response to the indication of the background data transfer opportunity, retrieve the media data according to the background data transfer, retrieve the media data of the media presentation according to the background data transfer;

send data indicating that the media data has been retrieved to the media player application executed by the one or more processors of the device; and send the retrieved data to the media player application.

13. A computer-readable storage medium having stored thereon instructions that, when executed, cause one or more processors of a client device to:

execute a media session handler (MSH) to:

receive, from a media player application executed by the one or more processors of the client device via an application programming interface (API) between the media player application and the MSH, a first request to retrieve media data of a media presentation from an application provider, the first request indicating retrieval of the media data according to a background data transfer, wherein receiving the first request comprises receiving a call to a function provided by the API, the function comprising a function for requesting a download via background data transfer;

in response to the first request to retrieve the media data of the media presentation, send a second request to retrieve media data according to the background data transfer to a media streaming application function (AF); and in response to the second request, receive an indication, from the media streaming AF, of a background data transfer opportunity of the media data of the media presentation, the indication including a notification of the background data transfer opportunity; and send data representative of the indication of the background data transfer to the media player application executed by the one or more processors; and execute the media player application to:

in response to the indication of the background data transfer opportunity, retrieve the media data of the media presentation according to the background data transfer; and store the retrieved media data.

14. The computer-readable storage medium of claim 13, wherein the instructions that cause the processor to retrieve the media data according to the background data transfer comprise instructions that cause the processor to:

determine an off-peak designated time window; and retrieve the media data during the off-peak designated time window.

15. The computer-readable storage medium of claim 14, wherein the instructions that cause the processor to determine the off-peak designated time window comprise instructions that cause the processor to determine the off-peak designated time window from data defining the off-peak designated time window included in the indication of the background data transfer opportunity.

16. The computer-readable storage medium of claim 13, wherein the media streaming AF comprises a 5G Media Streaming downlink (5GMSd) Application Function (AF) and wherein the instructions that cause the processor to execute the MSH to send the second request to retrieve the media data according to the background data transfer further comprise instructions that cause the processor to execute the MSH to send the second request to retrieve the media data according to the background data transfer to the 5GMSd AF.

17. The computer-readable storage medium of claim 13, further comprising instructions that cause the processor to execute the MSH to form the second request to include at least one of a list of one or more files of the media data to be retrieved, sizes of the one or more files, or a desired availability time for the background data transfer.

18. A computer-readable storage medium having stored thereon instructions that, when executed, cause one or more processors of a client device to:

execute a media session handler (MSH) to:

receive, from a media player application executed by the one or more processors of the client device via an application programming interface (API) between the media player application and the MSH, a first request to retrieve media data of a media presentation from an application provider, the first request indicating retrieval of the media data according to a background data transfer, wherein receiving the first request comprises receiving a call to a function provided by the API, the function comprising a function for requesting a download via background data transfer, in response to the first request to retrieve the media data of the media presentation, send a second request to retrieve media data according to the background data transfer to a media streaming application function (AF), and in response to the second request, receive an indication, from the media streaming AF, of a background data transfer opportunity of the media data of the media presentation;

in response to the indication of the background data transfer opportunity, retrieve the media data of the media presentation according to the background data transfer;

retrieve the media data of the media presentation according to the background data transfer;

send data indicating that the media data has been retrieved to the media player application executed by the one or more processors of the client device; and send the retrieved data to the media player application.

* * * * *